US010684135B2

(12) United States Patent
Stählin et al.

(10) Patent No.: US 10,684,135 B2
(45) Date of Patent: Jun. 16, 2020

(54) METHOD FOR UPDATING AN ELECTRONIC CARD OF A VEHICLE

(71) Applicant: Continental Teves AG & Co. oHG, Frankfurt (DE)

(72) Inventors: Ulrich Stählin, Oakland Township, MI (US); Marc Menzel, Weimar (DE); Richard Scherping, Liederbach am Taunus (DE)

(73) Assignee: CONTINENTAL TEVES AG & CO. OHG, Frankfurt (DE)

(*) Notice: Subject to any disclaimer, the term of this patent is extended or adjusted under 35 U.S.C. 154(b) by 155 days.

(21) Appl. No.: 15/940,207

(22) Filed: Mar. 29, 2018

(65) Prior Publication Data

US 2018/0292227 A1 Oct. 11, 2018

Related U.S. Application Data

(63) Continuation of application No. PCT/EP2016/072313, filed on Sep. 20, 2016.

(30) Foreign Application Priority Data

Sep. 29, 2015 (DE) .................. 10 2015 218 809

(51) Int. Cl.
*G01C 21/36* (2006.01)
*G01C 21/32* (2006.01)
(Continued)

(52) U.S. Cl.
CPC ......... *G01C 21/3617* (2013.01); *G01C 21/32* (2013.01); *G01C 21/367* (2013.01); *H04W 4/38* (2018.02); *H04W 4/46* (2018.02)

(58) Field of Classification Search
CPC .. G01C 21/32; G01C 21/3617; G01C 21/367; H04W 4/38; H04W 4/46
(Continued)

(56) References Cited

U.S. PATENT DOCUMENTS 9,177,476 B2 * 11/2015 Breed ................ G01C 21/3611
2012/0083947 A1 * 4/2012 Anderson ......... B60W 50/0098
701/3
(Continued)

FOREIGN PATENT DOCUMENTS

DE 10201012877 12/1899
DE 102007006870 A1 12/1899
(Continued)

OTHER PUBLICATIONS

Worrall, Stweart, et al, A Probabilistic Method for Detecting Impending Vehicle Interactions, 2008 IEEE International Conference on Robotics and Automation, May 19-23, 2008, pp. 1787-1791, Pasadena, CA USA.
(Continued)

*Primary Examiner* — Atul Trivedi

(57) ABSTRACT

A method for updating an electronic card in a vehicle based on a deviation between predicted states and actual states comprises calculating a predicted state of the vehicle, establishing an actual state of the vehicle, determining a deviation between the predicted state and the actual state, and storing information in the map if the predicted state and the actual state deviate from one another.

18 Claims, 4 Drawing Sheets

(51) Int. Cl.
*H04W 4/38* (2018.01)
*H04W 4/46* (2018.01)

(58) Field of Classification Search
USPC ......................................................... 701/450
See application file for complete search history.

(56) References Cited

U.S. PATENT DOCUMENTS

| | | | | |
|---|---|---|---|---|
| 2012/0221244 | A1* | 8/2012 | Georgy | G01C 21/165 |
| | | | | 701/472 |
| 2017/0078638 | A1* | 3/2017 | Alaniz | G06T 19/006 |
| 2019/0051153 | A1* | 2/2019 | Giurgiu | G01C 21/3691 |
| 2019/0186939 | A1* | 6/2019 | Cox | G05D 1/0088 |
| 2019/0294966 | A1* | 9/2019 | Khan | G01S 13/931 |
| 2019/0329769 | A1* | 10/2019 | Shalev-Shwartz | ............... |
| | | | | G05D 1/0253 |
| 2019/0329773 | A1* | 10/2019 | Shalev-Shwartz | ............... |
| | | | | B60W 30/0956 |
| 2019/0329783 | A1* | 10/2019 | Shalev-Shwartz | ............... |
| | | | | G05D 1/0253 |
| 2019/0333381 | A1* | 10/2019 | Shalev-Shwartz | ............... |
| | | | | G08G 1/0968 |
| 2020/0062264 | A1* | 2/2020 | Stein | G05D 1/0251 |

FOREIGN PATENT DOCUMENTS

| | | |
|---|---|---|
| DE | 102009008959 A1 | 12/1899 |
| DE | 102012212740 A1 | 12/1899 |
| EP | 0921509 A2 | 12/1899 |
| FR | 2997183 A1 | 12/1899 |

OTHER PUBLICATIONS

International Search Report and Written Opinion dated Dec. 7, 2016 from corresponding International Patent Application No. PCT/EP2016/072313.
German Search Report dated Sep. 1, 2016 for corresponding German Patent Application No. 10 2015 218 809.4.

* cited by examiner

METHOD FOR UPDATING AN ELECTRONIC CARD OF A VEHICLE

CROSS-REFERENCE TO RELATED APPLICATIONS

This application claims the benefit of PCT Application PCT/EP2016/072313, filed Sep. 20, 2016, which claims priority to German Application DE 10 2015 218 809.4, filed Sep. 29, 2015. The disclosures of the above applications are incorporated herein by reference.

TECHNICAL FIELD

The invention relates to automotive vehicles, more particularly to electronic maps for vehicles.

BACKGROUND

Electronic maps are used in vehicles, in particular for navigation purposes and for vehicle-to-X communication. Such vehicle-to-X communication, also referred to as Car2X, C2X or V2X communication, is in particular based on the standard IEEE 802.11p. This is the state of the art or respectively predevelopment and is currently being standardized. Likewise, self-learned maps or a road graph on the basis of current information from vehicle-to-X communication are the state of the art.

Numerous functions can be improved by map information. Map material is typically used for this, but this is expensive and can only be kept up-to-date in a costly and labor-intensive manner. In addition, large amounts of data are required, even if a typical vehicle will never require the largest sections of its map, because it will never be located in the region described therewith.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for updating an electronic map of a vehicle comprises calculating a predicted state of the vehicle, establishing an actual state of the vehicle, determining a deviation between the predicted state and the actual state, and storing information in the map if the predicted state and the actual state deviate from one another.

This is essentially based on the idea of training a map in the vehicle, and saving it for subsequent use. In the process, essentially only that information is saved, which results in deviations in the behavior of functions, for example states, or of movement data, in a prediction without a map. This makes it possible, on the one hand, to autonomously create an electronic map in a vehicle, without having to have recourse to purchased or otherwise externally procured data material for this. Furthermore, as a result of reducing the data to information which has resulted in deviations between a predicted state and an actual state, the amount of data to be stored in total is significantly reduced.

In this case, a state may in particular be a route of the vehicle. In the process, one embodiment may be executed as follows: calculating a predicted route of the vehicle, establishing a route actually driven by the vehicle, determining a deviation between the predicted route and the route actually driven, and storing information in the map if the predicted route and the route actually driven deviate from one another.

A route is typically a variable which may be continually recorded, calculated and compared during driving. In addition, a route which is driven by the vehicle is a very reliable indicator of a course of a road.

However, it should be mentioned that a state is not restricted to a route. Rather, predicted states may be used in general. This may, for example, also be the critical nature of a situation or a driver warning derived therefrom. It is therefore possible, for example, to predict how a situation such as, for example, a route driven, an event, an internal state such as situation evaluations, etc. will develop, and to use this in order to determine the deviation.

It should be mentioned that updating may also mean creating. The method may essentially be applied both in the case that a previously installed map is already present and in the case that no previously installed map is present. Therefore, a vehicle may be equipped with an electronic map, for example on delivery, which is then continually updated by means of the method. However, an electronic map may also be created from scratch by means of the method.

The predicted state may be calculated based on the map. This may be the case if information which is relevant to this is present in the map. Therefore, it may be possible to establish information in the map, which results in a predicted behavior that deviates from the real behavior. One advantage of updating the map is therefore established.

The predicted state may be calculated based on movement data of the vehicle, in particular the position, velocity and/or acceleration. Such movement data may be for predicting, in particular, a route or also other states such as, for example, expected collisions.

The predicted state may be calculated based on data from other vehicles and/or based on data regarding the surroundings of the vehicle, in particular from environment sensors and/or vehicle-to-X communication. Such data may be for predicting a state such, as in particular, a route.

The predicted state may in particular be calculated using one or more of the following prediction models: 1st order cinematic model (Constant Velocity, CV); 2nd order cinematic model (Constant Acceleration, CA); Constant Turn Rate and Velocity (CTRV) Constant Turn Rate and Acceleration (CTRA); Constant Steering Angle and Velocity (CSAV); Constant Steering Angle and Acceleration (CSAA); Prediction model having an estimated curvature, in particular from a yaw rate; Maneuver-dependent prediction; Neural network; Support vector machine; Polynomial of the nth degree; and Stoppage prediction.

A first order cinematic model may in particular be based on the following formula:

$$x(T)=x(0)+v \cdot T$$

wherein:
x=distance
T=time
v=velocity

A second order cinematic model may in particular be based on the following formula:

$$x(T)=x(0)+v \cdot T+0.5 \cdot a \cdot T^2$$

wherein additionally:
a=acceleration

A prediction model having an estimated curvature may in particular be base on the following formula:

$$\Delta \psi(T)=\dot{\psi} T$$

The yaw angle is designated by □ here, which is typically established from the yaw rate which exists as a measuring variable in each typical vehicle having ESC (Electronic Stability Control).

Depending on the situation and depending on the available data as well as depending on the available computational power, a prediction model which is suitable in each case may be selected from these prediction models, in order to predict a state and, in particular, a route.

The actual state may be established based on movement data of the vehicle, in particular the position, velocity and/or acceleration. The actual state may also be established based on data from other vehicles and/or based on data regarding the surroundings of the vehicle, in particular from environment sensors and/or vehicle-to-X communication. Such data may be for calculating an actual state, in particular a route actually driven by a vehicle.

Another embodiment of the method may additionally have a step of establishing the information based on the deviation. This allows the information, with which the map is updated, to be established as a function of the deviation. The map may therefore be updated so that deviations are avoided if at all possible in future.

According to a further development, the step of storing information may only be executed if the deviation exceeds a threshold. This prevents excessive loading of the computing capacity and of the data transmission capacity to the map, since information is only stored in the map if the size of the deviation indicates that updating is actually necessary as well.

The information may include or be adjusted values, with which the predicted state would correspond to the actual state. Such information may be recalculated from the deviation. Therefore, the map is updated in a way that no further deviation should occur during the next use of the corresponding information or respectively data.

The information may include possible routes at a fork, in particular including a previous split. It may therefore be established, for example, that multiple lanes are present at an intersection, which are assigned to different driving directions. A typical turning lane is to be indicated as an example of this. It may therefore be detected by means of another embodiment of the method, for example, that a vehicle is essentially located in a left or right turning lane, before it turns left or right. In addition, it may be detected that a vehicle is essentially located in a lane for traffic going straight on if it continues to go straight on. This makes it possible, in subsequent cases, to calculate the route and the behavior of a vehicle in advance even better since, for example, changing to a special lane for turning maneuvers may also be detected if the driver has failed to indicate.

According to a further development, another embodiment of the method additionally has the following step of calculating a predicted state, in particular a route, of another vehicle, wherein the deviation is also determined based on the predicted state and/or the actual state of the other vehicle.

Interactions with other vehicles may therefore also be included in the calculations and may be included in the updating of a map. If, for example, a vehicle is driving on a collision course with a different vehicle, the subsequently established fact that a collision has not occurred may indicate the presence of a bridge or an overpass. The map may be updated accordingly so that no further collision warnings are produced at this point in future.

In particular, indications of regions with stored information may be stored in the map. It may therefore already be determined at an early stage of the processing of the information whether relevant information is present in a map which needs to be read out and considered. Appropriate flags may be set, for example.

Indications regarding the storage time, a number of confirmations, an integrity level and/or the origin of a piece of information or confirmation may also be stored in the map with the information. This allows a conclusion regarding how reliable a piece of information is.

An integrity level may be established based on a comparison between a map created on the basis of the information and another map. The other map may be a map which was originally present in the vehicle, for example a map programmed in on delivery or a map loaded from a CD, a similar data source or an internet server. It may therefore be established how well a map created on the basis of the information, i.e. a learned map, matches another map. If they match closely, a high integrity level may be established, and vice versa.

A method for establishing an integrity level on the basis of the comparison between information from an existing map and learned information may therefore be carried out. Such an established integrity level may be used in the other aspects of the method described herein. For example, a warning about a state of danger may be omitted if the data, on which a calculation of a presumably safe state is based, have a high integrity level. It is understood that such a method for establishing an integrity level represents an autonomous aspect. This may, however, also be combined at will with the other aspects of the method disclosed herein.

The map may include road topology which may be enriched by the information. Therefore, the usual course of roads may be indicated in the map, which may also be used, for example, for navigation purposes. It should be mentioned, however, that a map may alternatively be created or respectively defined based on abstract data as well, which merely includes the information which is used for predictions within the framework of another embodiment of the method according. In this case, the creation of topographically comprehensible information may be dispensed with. Such maps may then typically only be used in connection with additional data such as, for example, movement data of the vehicle.

Within the framework of one embodiment of the method, both the vehicle's own movement data such as the position, velocities or accelerations and data from other vehicles, for example established by means of environment sensors or vehicle-to-X communication, as well as data regarding the surroundings, for example established by means of environment sensors or vehicle-to-X communication, may be used. Ideally, the own movement data are, in this case, used as the basis, since these are always available. If the data are to be primarily used for vehicle-to-X applications, these input data are also typically present and are consequently essentially used. Data from environment sensors and map material, e.g. from an e-horizon, are, by way of contrast, dependent on the equipment and may be optionally used.

In order to keep the database size of a map small, the map of the complete distance driven is preferably not learned. Instead, a prediction of the movement of the vehicle is preferably carried out at any point in time and temporarily stored. The current position is then compared with the associated prediction at any point in time. Only if the deviation exceeds a threshold is the corresponding position stored in the map. Possibly, only the adjusted values for a prediction are, in this case, stored, i.e. with which parameters the prediction would be correct again after all. It is therefore possible, on the one hand, to obtain a significantly more precise prediction than without a map and, on the other hand, to manage with significantly less information in the map than in the case of a complete map.

The concept may also be extended in that it is not only stored where the prediction of the movement of a vehicle (egovehicle or vehicles in the surroundings) does not correspond to the actual model assumption, but where a deviation from the application logic occurs. This may e.g. be the case at an overpass where the application might incorrectly assume that it is an intersection. The respective prediction of the movement from the prediction model is, in each case, correct for both intersecting routes, however the height difference may possibly not be easy to show. However, if the map learns that the vehicles may intersect at the point without colliding, this may be stored accordingly, because this contradicts the actual application logic.

Different algorithms which are known per se may be used as prediction models, for example:

1st order cinematic model: $x(T)=x(0)+v*T$ (Constant Velocity, CV)

2nd order cinematic model: $x(T)=x(0)+v*T+0.5*a*T^2$ (Constant Acceleration, CA)

Constant Turn Rate and Velocity (CTRV)

Constant Turn Rate and Acceleration (CTRA)

Constant Steering Angle and Velocity (CSAV)

Constant Steering Angle and Acceleration (CSAA)

Prediction model having an estimated curvature (e.g. from the yaw rate): $\Delta\psi(T)=(\psi T)$ Maneuver-dependent predictions Neural networks Support vector machines Polynomials of the nth degree.

In the process, the cinematic models may, for example, be configured 1-dimensionally or 2-dimensionally (including in a mixed form, i.e. for example 2nd order in the y-direction and 1st order in the x-direction, or vice versa). A stoppage prediction may additionally be used, so that no abrupt reversing is predicted.

All other models may also be configured multi-dimensionally.

Which possible paths a vehicle may take at a junction and whether these paths already split up in advance may be stored as further information for applications, in order to thereby facilitate the selection of prediction. For example, different lanes for traffic travelling in a straight line, turning left or turning right are typically located at intersections. If it is learnt which lane is used for which driving direction, it may also be detected without using the indicator which prediction should be used for the intersection. This may be for left turn assistants where, in many cases, the indicator information, which would otherwise be necessary, is lacking.

In the event that a digital map (e.g. eHorizon, navigation, etc.) is used as the source of the prediction, it is favorable to distinguish those parts of the map which are unknown from those where the predictor fits, and to store whether information is available for a region. However, this may be done in a space-saving manner by setting only one flag. In the event that no digital map stores the information, an own map may be generated by a positive list over time, which map may then also be used accordingly in order to support e.g. eHorizon functions, i.e. in particular functions relating to a prediction of road features such as, for example, traffic circles.

Ideally, factors such as how often the information has already been confirmed and how old the last confirmation is as well as the source from which the confirmation comes are stored, in addition to any information in the map. Confirmations coming from the egovehicle are, in this case, more reliable than, for example, information which has been received via vehicle-to-X communication.

If map data are already present in the vehicle, one embodiment of the method may be used to build up a redundancy and therefore to increase the reliability level (integrity level) of the map information as a whole. To this end, the information from the existing data is compared with the data from the self-learned map. If both match, a corresponding integrity level may be output. If only map data are available and no self-learned map, a correspondingly lower integrity level is preferably output. If only self-learned map data are available and no other map data, a corresponding integrity level is preferably also output, which is however higher than the integrity level with the map but without the self-learned map. If data deviating from the self-learned map are stored in the map data, for example because the map still additionally has the number of lanes, a fusion of the information preferably takes place. In this case, a corresponding integrity level is also indicated in the case of each datum which is only present in one of the two maps.

One embodiment of the method for learning a map may also be used to handle special situations. The "normal" topology of the road, i.e. the course of the road, may be learnt by means of traditional methods and may be described as a sequence of nodes and connections (or as polygons, splines, etc.). Only in situations where this representation leads to an incorrect prediction of the situation, as shown for example in the described method, is the information which is necessary to correctly predict the situation additionally stored.

Furthermore, an electronic control module is configured to execute a method as described herein. In addition, a computer-readable storage medium contains program code, in the execution of which a processor executes the method described herein.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
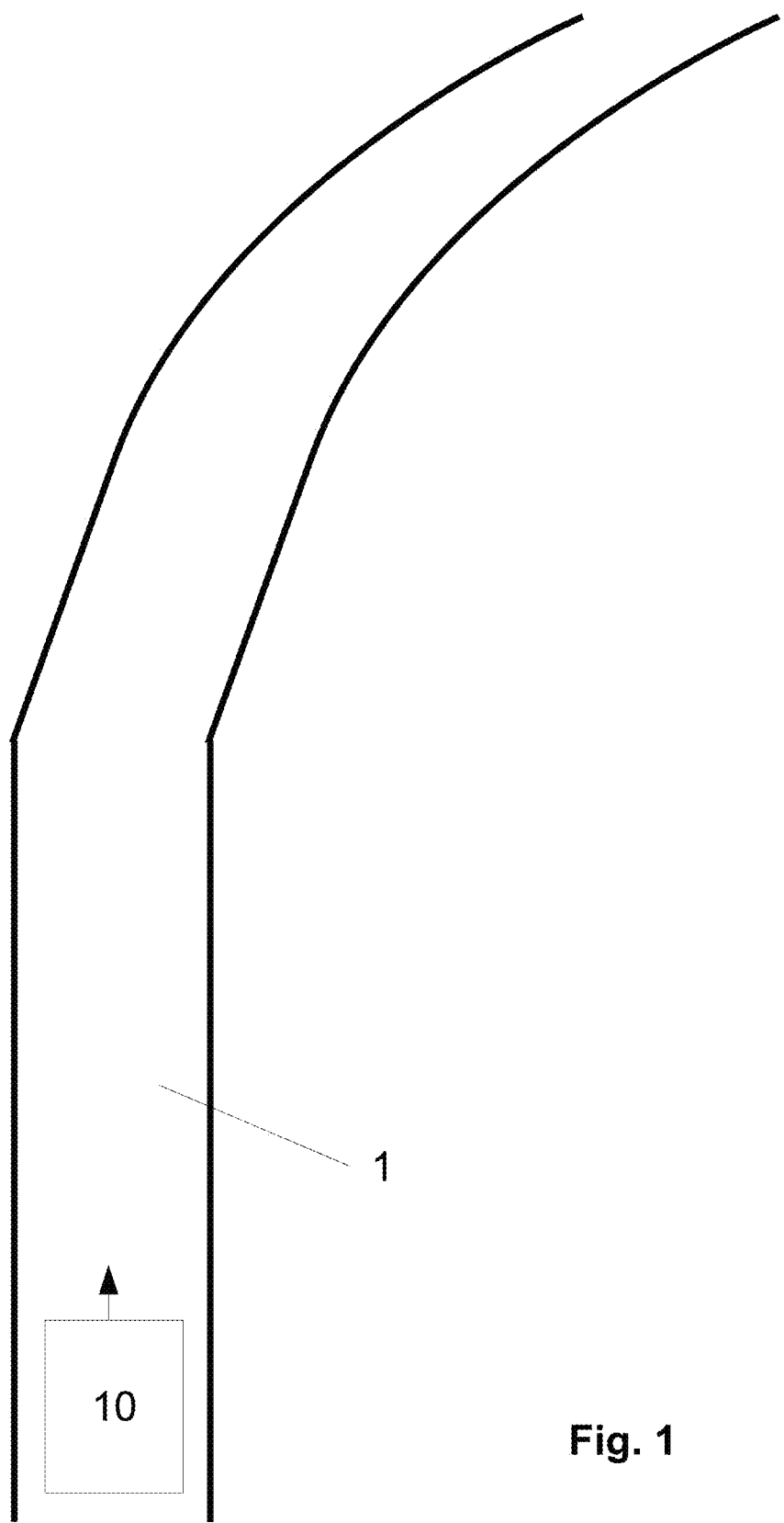
FIG. 1: shows a situation with a vehicle and a bendy road.

FIG. 1 shows a situation, in which a vehicle 10 is driving on a road 1. The vehicle 10 moves in a straight line and approaches a bend in the road 1. On the basis of the current movement data, it is predicted that the vehicle will continue driving in a straight line. As soon as the vehicle 10 drives into the bend, the prediction and route driven no longer fit together. This position is stored in the map, together with the parameters for the prediction model, which are necessary so that the prediction fits again.

Figure 2:
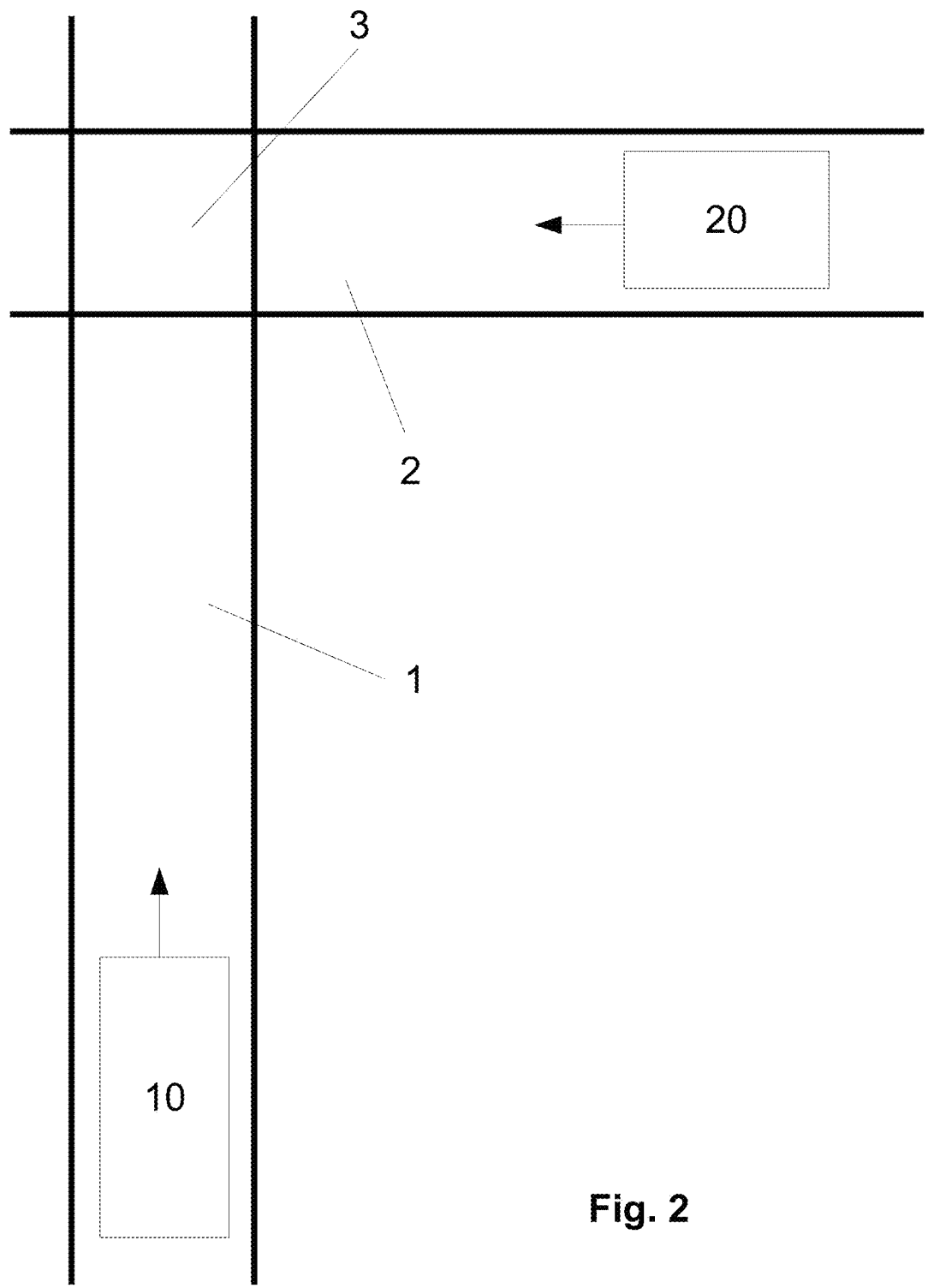
FIG. 2: shows a situation with two roads and two vehicles.

FIG. 2 shows a situation, in which a first vehicle 10 approaches an intersection zone 3 on a first road 1, while a second vehicle 20 is likewise approaching the intersection zone 3 on a second road 2 at the same time.

While the first vehicle 10 is approaching the intersection zone 3, information is received via vehicle-to-X communication from the second vehicle 20 which is likewise approaching the intersection zone 3, and indeed at a 90° angle to the first vehicle. The predictions for the first vehicle 10 and the second vehicle 20 identified via vehicle-to-X messages each assume driving in a straight line. The application would typically have to conclude from this that a collision will take place, in particular taking into account the distances and velocities of the vehicles 10, 20. By virtue of data from other objects having vehicle-to-X communication capability, it was however possible to conclude that the vehicles 10, 20 would not meet at this intersection zone and this information was stored in the self-learned map, since it deviates from the actual logic of the application. In other words, it was detected that the intersection zone 3 is not an intersection, but an overpass, which excludes the possibility of a collision. By virtue of the information in the map, the application may interpret the situation correctly and avoids issuing an unnecessary warning to the driver.

Figure 3:
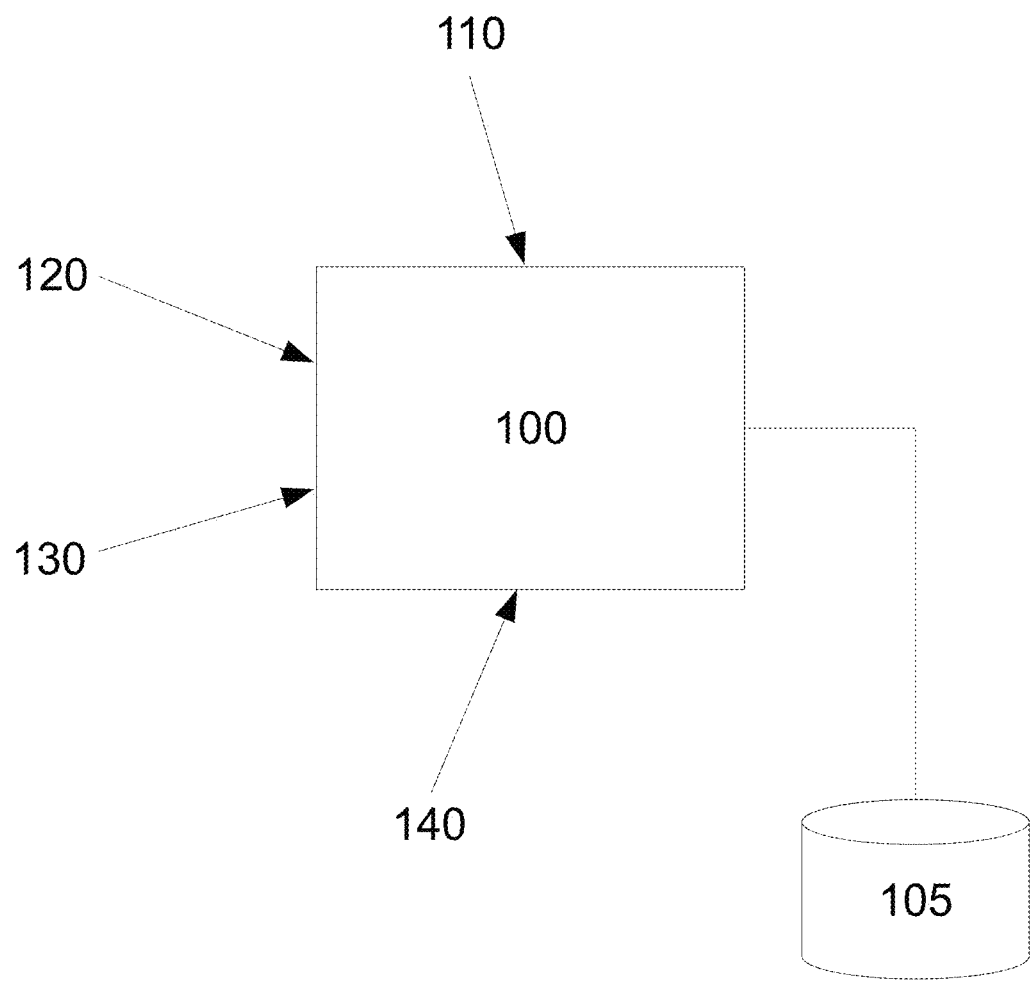
FIG. 3: shows a device for carrying out the method according to the invention.

FIG. 3 shows one embodiment of a device for performing the method. This has a computing module 100 as well as a database 105. The computing module 100 is configured to execute the method as described at other points in this application. In the process, the database 105 stores information which was obtained in accordance with the method. The computing module 100 may be a sensor fusion unit. The sensor fusion unit is designed in such a manner that it detects different measurement variables via multiple sensors which are independent of each other, and checks the plausibility of these and improves the quality of the sensor data.

The computing module 100 is, in this case, supplied with different data.

Firstly, these data are data 110 from vehicle-to-X communication. This may be, for example, driving routes of other vehicles, exterior lights, position data (x, y, z), time data (t), velocity data (v), course, bend radius (1/r), yaw rate or a one-dimensional or two-dimensional acceleration.

In addition, these are data 120 from local sensors such as a camera or radar.

Furthermore, these are data 130 from a system which predicts certain road states such as, for example, intersections, traffic circles or other traffic-related situations. For example, this may be an eHorizon.

In addition, these are data 140 from the egovehicle, for example the position (x, y, z), time (t), velocity (v), course, bend radius (1/r), one-, two- or three-dimensional orientation, one-, two- or three-dimensional rates and/or one, two- or three-dimensional acceleration.

Both predictions of states and comparisons between these predictions and actual states may be carried out by means of these data 110, 120, 130, 140. Such states may, for example, be a route of the vehicle, but also a collision with another vehicle. Information may then be obtained for an electronic map from such comparisons, which information may be stored in the database 105 and may be used for later predictions.

Figure 4:
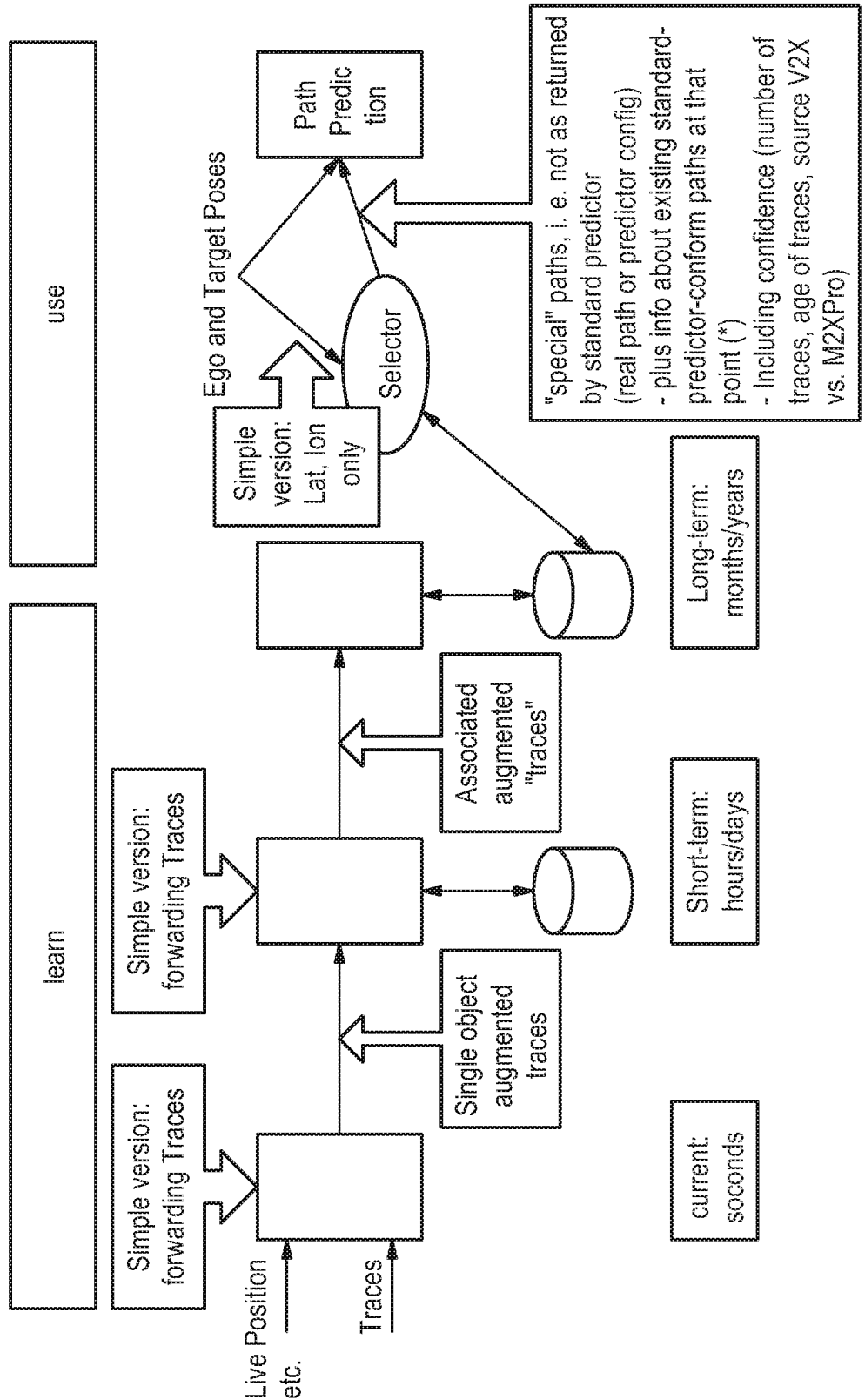
FIG. 4: shows a fundamental procedure of learning phases.

FIG. 4 shows a possible architecture or system architecture for the described method, divided up into a learning phase and an application phase or respectively use phase, wherein both phases may run at the same time.

During the learning phase ("learn"), input data, for example the previously mentioned data 110, 120, 130, 140, may in particular be used to build up the maps. In this case, information in accordance with an embodiment or respectively implementation of the method is generated and stored. The learning phase is divided into multiple levels in this embodiment example. A distinguishing feature of said levels is the time reference of the levels. In a first level, a learning phase which comprises several seconds is run through. In this learning phase, a simple prediction of the egoposition is performed starting from the egoposition. In a second level, which comprises several hours or days, the egoposition and the state prediction is linked with one or individual objects, for example from the surroundings. In a third level, in which data are collected and used over weeks, months or years, an extensive association of objects and older state predictions is carried out. This may then, in turn, be used to establish the state prediction in a particular situation more precisely. The selection of the state to be predicted may, in this case, take separate account of particular states or respectively paths which have a particular feature and which deviate from the standard, or respectively have a high deviation. In a similar way, the integrity level or reliability evaluations of older state predictions may be considered separately in order to improve the prediction during use.

During the use phase ("use") the input data may, in particular, be used to compile a path prediction or a different prediction of a state with the aid of the learned map. Such a prediction may, in turn, be used within the framework of the method.

Both phases may also be effected at the same time and on the basis of the same input data, however they may also take place independently or respectively in different ways, in particular at different times.

It should be pointed out in general that vehicle-to-X communication means, in particular, a direct communication between vehicles and/or between vehicles and infrastructure facilities. For example, therefore, vehicle-to-vehicle communication or vehicle-to-infrastructure communication may be involved. Where communication between vehicles is referred to within the framework of this application, this may essentially, for example, take place within the framework of vehicle-to-vehicle communication, which typically takes place without the intermediary of a mobile network or a similar external infrastructure and which may therefore be distinguished from other solutions which, for example, are based on a mobile network. For example, vehicle-to-X communication may take place using the standards IEEE 802.11p or IEEE 1609.4. Vehicle-to-X communication may also be referred to as C2X communication. The sub-areas may be referred to as C2C (Car-to-Car) or C2I (Car-to-Infrastructure). The invention expressly does not, however, exclude vehicle-to-X communication with the intermediary of, for example, a mobile network.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for updating an electronic map of a vehicle, the method comprising:
   receiving, at a computing device, data by way of vehicle-to-X communication;
   calculating, at the computing device, a predicted state of the vehicle based on the data;
   establishing, at the computing device, an actual state of the vehicle;
   determining, at the computing device, a deviation between the predicted state and the actual state;
   storing, at a database in communication with the computing device, information in the electronic map when the predicted state and the actual state deviate from one another; and
   updating, at the computing device, the electronic map based on the stored information.

2. The method according to claim 1, wherein the state is a route of the vehicle.

3. The method according to claim 1, wherein the predicted state is calculated based on the map.

4. The method according to claim 1, wherein the predicted state is also calculated based on movement data of the vehicle, the movement data includes at least one of position, velocity and acceleration.

5. The method according to claim 1, wherein the received data includes data from other vehicles and data regarding the surroundings of the vehicle.

6. The method according to claim 1, wherein the predicted state is calculated using at least one prediction models comprising:
   1st order cinematic model;
   2nd order cinematic model;
   constant turn rate and velocity;
   constant turn rate and acceleration;
   constant steering angle and velocity;
   constant steering angle and acceleration;
   prediction model having an estimated curvature from a yaw rate;
   maneuver-dependent prediction;
   neural network;
   support vector machine;
   polynomial of the nth degree; and
   stoppage prediction.

7. The method according to claim 1, wherein the actual state is established based on movement data of the vehicle, wherein the movement is at least one of position, velocity and acceleration.

8. The method according to claim 1, wherein the actual state is established based on one of: data from other vehicles and based on data regarding the surroundings of the vehicle.

9. The method according to claim 1, further comprising establishing the information based on the deviation.

10. The method according to claim 1, wherein storing information is only executed when the deviation exceeds a threshold.

11. The method according to claim 1, wherein the information includes values with which the predicted state would correspond to the actual state.

12. The method according to claim 11, wherein the information is adjusted for values with which the predicted state would correspond to the actual state.

13. The method according to claim 1, wherein the information includes possible routes at a fork.

14. The method according to claim 1, further comprising:
   calculating a predicted state, wherein the predicted state is a route of another vehicle; and
   determining the deviation based on one of the predicted state and an actual state of the other vehicle.

15. The method according to claim 1, wherein indications of regions with stored information are stored in the map.

16. The method according to claim 15, wherein indications regarding one of: a storage time, a number of confirmations, an integrity level, an origin of a piece of information, and confirmation are stored in the map with the information.

17. The method according to claim 15, wherein an integrity level is established based on a comparison between a map created on the basis of the information and another map.

18. The method according to claim 15, wherein the map includes road topology which is enriched by the information.

* * * * *